United Stat
Graube

[11] 3,967,963
[45] July 6, 1976

[54] BLEACHED HOLOGRAPHIC MATERIAL AND PROCESS FOR THE FABRICATION THEREOF USING HALOGENS

[75] Inventor: Andrejs Graube, Canoga Park, Calif.

[73] Assignee: Hughes Aircraft Company, Culver City, Calif.

[22] Filed: Sept. 2, 1975

[21] Appl. No.: 609,634

Related U.S. Application Data

[63] Continuation of Ser. No. 463,013, April 22, 1974, abandoned.

[52] U.S. Cl. .................................. 96/27 H; 96/60 R; 350/3.5
[51] Int. Cl.$^2$ ........................ G03C 5/04; G03C 5/32
[58] Field of Search ............. 96/27 H, 60 R; 350/3.5

[56] References Cited
UNITED STATES PATENTS

| | | | |
|---|---|---|---|
| 3,642,472 | 2/1972 | Mayo | 96/27 H |
| 3,775,111 | 11/1973 | Norman | 96/27 H |
| 3,925,077 | 12/1975 | Lewis et al. | 96/27 H |

OTHER PUBLICATIONS

H. Thiry, "New Technique of Bleaching Photographic Emulsions and its Application to Holography," *Applied Optics*, VII, No. 7, 1652 (July 1972).

*Primary Examiner*—Edward C. Kimlin
*Attorney, Agent, or Firm*—Booker T. Hogan; W. H. MacAllister

[57] ABSTRACT

Silver halide holographic materials have been fabricated by a bleach process which yields substantially improved printout stability while retaining high diffraction efficiencies. Halogen vapors, liquids and non-aqueous solutions are employed to transform amplitude holograms into thick phase holograms in processes that are relatively inexpensive and simple to complete. Recorded patterns produced by these processes may be used for diffraction gratings, Fresnel zone plates, optical elements and the production of special waveforms.

7 Claims, 4 Drawing Figures

BLEACHED HOLOGRAPHIC MATERIAL AND PROCESS FOR THE FABRICATION THEREOF USING HALOGENS

The invention herein described was made under and during the course of a contract or subcontract with the U.S. Navy.

This is a continuation of application Ser. No. 463,013, filed Apr. 22, 1974, now abandoned.

BACKGROUND OF THE INVENTION

1. Field of the Invention

The invention lies in the art of hologram production and fabrication.

2. Description of Prior Art

Bleach solutions comprised of halide salts have been employed to increase the diffraction efficiency of photographically recorded three-dimensional interference patterns. Juris Upatnieks and Carl Leonard "Diffraction Efficiency of Bleached, Photographically Recorded Interference Patterns" *Applied Optics*, Vol. 8, No. 1,85 (1969). High diffraction efficiency holograms are obtained; however, these holograms are degraded upon prolonged exposure to visible light.

An alternative method of increasing the diffraction efficiency of similar materials is disclosed by R. L. Lamberts and C. N. Kurty "Reversed Bleaching for Low Flare Light in Holograms" *Applied Optics*, Vol. 10, No. 6, 1342 (1971). The process required special development prior to the application of a bleach comprised of an aqueous solution of potassium dichromate and sulfuric acid. It too yields holograms which degrade upon prolonged exposure to visible light.

H. Thiry, in his article "New Technique of Bleaching Photographic Emulsions and Its Application to Holography" *Applied Optics*, Vol. II, No. 7, 1652 (July 1972) discloses a process wherein the photographic emulsion is bleached by exposure to bromine vapors in a vacuum vessel and subsequently washed with water prior to drying. This process can be deemed an improvement over that disclosed by either Lamberts or Upatnieks however, it too is deficient in that the holograms degrade upon further exposure to visible light.

As holograms darken upon exposure to intensive light sources, there is a reduction of diffraction efficiency and light transmission which clearly limits their usefulness. Many investigators have sought to overcome this problem (See Scott L. Norman "Dye-Induced Stabilization of Bleached Holograms" *Applied Optics*, Vol. II, No. 5, 1234 (may 1972) and references cited therein, without apparent success. My process yields holograms which are stable with respect to printout characteristics while maintaining high diffraction efficiency and good image quality.

SUMMARY OF THE INVENTION

I have discovered that holograms having new and unexpectedly superior characteristics can be prepared by a bleaching process which utilizes halogens to transform collodial silver to transparent halide compounds. Halogens found to be effective in bleaching photographically recorded interference patterns and bromine and chlorine. The process is simple in that only one step is required; the emulsions are exposed to halogen vapors, liquids or non-aqueous solutions and are aerated until excess halogens have been removed. Tests have shown that holograms fabricated in this manner exhibit superior printout characteristics.

DESCRIPTION OF THE INVENTION

Figure 1:
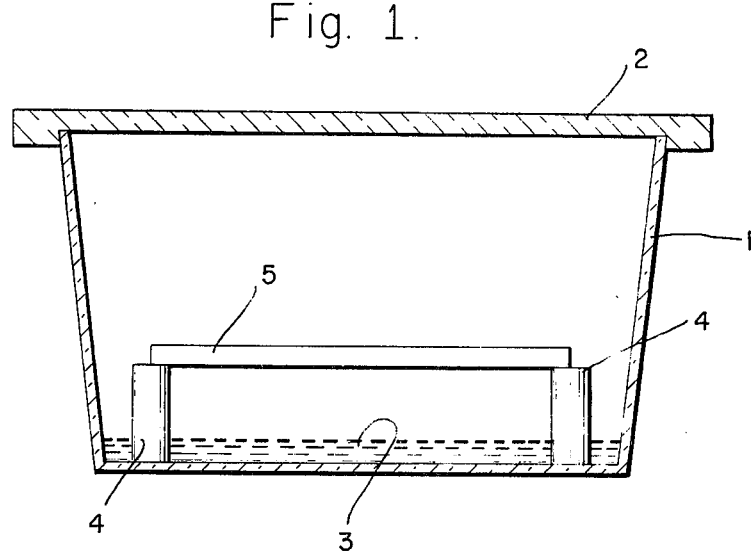
FIG. 1 is a sectional view in elevation of a typical apparatus for bleaching holograms. This figure shows a vessel 1 having a cover 2 containing liquid bromine 3 which emits vapors that impinge upon a holographic plate 5 placed upon standoff legs or supports 4 which may be varied in length to increase or decrease the bleaching rate.

The formation of high diffraction efficiency, thick, phase holograms from photographically recorded interference patterns via transformation of a holographic silver image to a transparent silver salt has been under investigation for several years. Several oxidizing agents have been evaluated and special techniques devised. R. L. Lamberts and C. N. Kurtz, Appl. Otp. 10, 1342 (1971); C. B. Burckhardt and E. T. Doherty, Appl. Opt. 8, 2479 (1969); D. H. McMahon and W. T. Maloney, Appl. Opt. 9, 1363 (1970). However, all of these techniques involve the application of liquid solutions to the emulsion layer in multistepped complicated procedures.

Although silver is a relatively inert metal, electrochemical measurements predict that metallic silver can be directly oxidized by the elemental halogens: $Br_2$, $Cl_2$, and $F_2$. F. Daniels and R. A. Alberty, *Physical Chemistry* (John Wiley and Sons, New York, 1962), Chap. 14. Indeed it has been found that bromine can react with silver particles in the photographic emulsion matrix. H. Thiry, Appl. Opt. 11, 1652 (1972). Moreover, halogen gas or vapor application to thick amplitude holograms forms high diffraction efficiency, low distortion, thick, phase holograms. Advantages of this simpler approach are: readily available bleach materials, simple bleaching technique, predictable chemical products, and stable resultant holograms.

I have found that an unexpectedly superior hologram can be fabricated via direct oxidation in a process similar to but much simpler than that disclosed by Thiry, supra. My studies have shown that elemental halogens may be applied directly to photographically recorded emulsions in a one step bleaching process requiring no special equipment and relatively inexpensive materials. My process differs from that of Thiry in that no vacuum equipment is employed and I do not wash the holograms after bleaching in water. The differences in printout stability between holograms produced by my process and that of Thiry and others is rather astounding and may be attributed to the utilization of water and/or other aqueous solutions in the bleaching process.

EXPERIMENTAL STUDIES

Various methods of direct halogen bleach application to amplitude holograms were explored. The amplitude silver holograms used for these experiments were derived from Kodak 120-02 plates (with an emulsion approximately 6 $\mu$m thick) and exposed with HeNe laser light at 632.8 nm. A symmetric transmission geometry with a 30° included angle between the collimated beams was used, with a beam ratio of about 1:1.

The plates were exposed to give a post development optical density of about four. The same geometry was used for the other experiments, but the exposure was varied. The exposed plates were processed in: Kodak D-19 developer (5 mins.); short stop (30 s); Kodak Rapid Fixer with hardener (10 min.); deionized water wash (15 min.); Kodak Photo-Flo 200, diluted 1:200 with deionized water (30 s); and air dried (relative humidity ~ 50%).

The diffraction efficiencies obtained from various halogen bleach types are presented in Table I. Both bromine and chlorine are effective bleaching agents, but since silver bromide has a larger refractive index ($n=2.25$) than silver chloride ($n=2.07$), the diffraction efficiencies obtained with bromine are better by approximately a factor of two than those obtained with chlorine. The index of refraction for gelatin is about 1.54.

TABLE I

Experimental Results for Bleach Hologram Diffraction Efficiency

| | Bleach Type | Diffraction Efficiency (% of incident light diffracted into the first order) |
|---|---|---|
| (1) | Bromine vapor | 70.8 |
| (2) | Bromine liquid | 63.8 |
| (3) | Bromine liquid dissolved in carbon tetrachloride (1:4 volume ratio) | 63.9 |
| (4) | Chlorine gas (derived from aqua regia solution) | 33.9 |
| (5) | Chlorine gas (derived from HCl + $K_2Cr_2O_7$ solution) | 35.0 |

The bleach containing bromine in a relatively inert solvent, $CCl_4$, offers little advantage over the direct bromine liquid bleach, except that the reaction rate is controllable and proportional to the bromine concentration. Other inert solvents taken from the group consisting of $CCl_4$, $CBr_4$, $C_2Cl_6$ and other halogenated hydrocarbons may be used.

As predicted from electrochemical data, we found that iodine (dissolved in $CCl_4$) will not oxidize Ag directly to AgI, although AgI may be obtained from Ag by alternate chemical methods. See McMahon, supra.

Conversion of the metallic Ag to a water-soluble salt was also attempted via vapor application. We exposed amplitude holograms to fuming nitric acid vapors, and achieved silver bleaching. However, the holographic image was destroyed in the process. We believe that a water soluble salt (i.e., $AgNO_3$) was formed, and it had enough mobility in the polar gelatin layer to diffuse across fringe boundaries. When concentrated HCl was applied to an amplitude hologram prior to fuming $HNO_3$ vapor exposure, the holographic image bleached and persisted. It is thought that the HCl in combination with $HNO_3$ acts as aqua regia (in situ), liberating $Cl_2$, which reacts with the silver to produce AgCl.

PREFERRED EMBODIMENTS

Our conclusion from the results above is that the $Br_2$ vapor bleach is the most effective and desirable for hologram bleaching. The application of $Br_2$ vapor bleach is straightforward and simple: a dry amplitude hologram is placed in a closed vessel in the presence of bromine liquid but not in contact with the liquid. A convenient way to express the concentration of the vapor in the vessel used for these experiments is by the vessel volume and surface area of exposed bromine liquid. If a rectangular glass container, measuring 5×7×9 cm, is employed with a liquid bromine surface area of 10 cm², then 2×2 in. Kodak 120-02 plates, exposed and developed to densities of 2 to 8, will bleach to subjective transparency in about 15 mins. Bromine vapor exposures in excess of 2 hours have no deleterious effect on the emulsion, but exposures greater than 2 days cause severe softening of the gelatin layer. We believe that the 2-day vapor exposures produced much bromination of the gelatin molecules, resulting in association hydrogen bond destruction and disruption of film integrity.

Following the $Br_2$ vapor bleach, the plates have an objectionable yellow stain caused by unreacted bromine in the emulsion layer. This stain can be removed by allowing the plates to stand overnight in the moving ambient air of a fume hood.

Subjective evaluation of the holograms bleached with bromine vapor showed that they have very low film distortion when compared with plates bleached with wet methods. Since both development and bleaching affect hologram resolution, bleaching in dry bromine vapor minimizes that portion of the resolution loss caused by the bleaching process.

A further advantage of $Br_2$ vapor bleaching is that the bromine destroys the sensitizing dye in the emulsion, leaving a clear film.

A shortcoming of this dry bleaching process is the toxicity of the bleach chemical. Bromine is a reactive element and is considered deleterious both to the skin and respiratory tract. The vapor bleach should be applied in a fume hood while wearing protective goggles and rubber gloves.

ENVIRONMENTAL CHARACTERISTICS

Perhaps the most outstanding feature of bromine bleached holograms is their permanence even in very hostile environments.

A bromine vapor-bleached hologram was baked at 164°C for 1 hour without darkening or suffering loss of diffraction efficiency.

Figure 2:
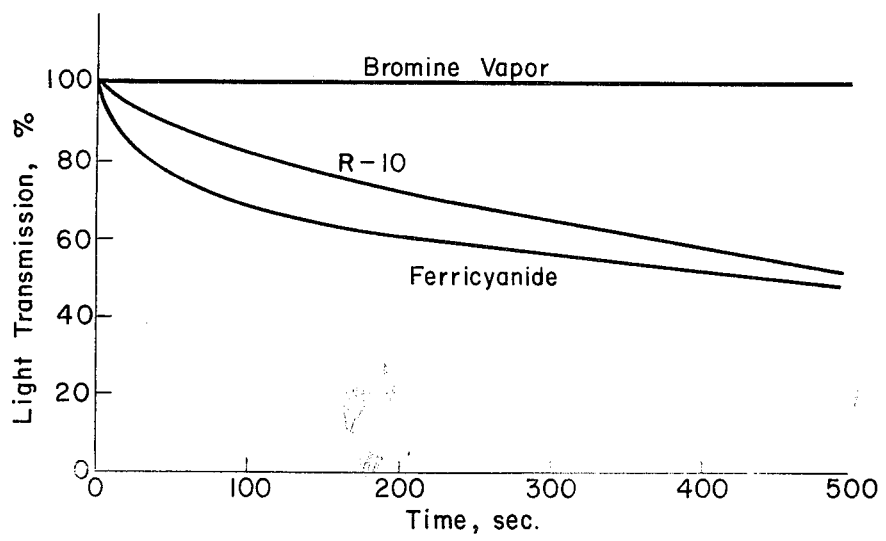
FIGS. 2, 3 and 4 are representative curves illustrating respective light transmission as a reaction of illumination time. Optical density vs. exposure for three different developers and diffraction efficiency vs. optical density.

The printout stability of bromine vapor-bleached holograms in the presence of intense illumination was tested and compared with the stability of holograms bleached with several conventional wet bleach methods. The illumination stress was applied in the form of a 100 mW, 2 mm diameter, 514.5 nm argon laser beam. The light transmitted through the holograms was monitored and recorded on a chart recorder. FIG. 2 shows that wet bleach holograms darken rapidly, but bromine vapor bleached holograms show no detectable printout after 500 s (i.e., a total flux of about 1600 J/cm²).

Stabilization of wet bleach holograms, by imbibing dyes into the emulsion, has been previously attempted, but when an illumination stress was applied, similar to the one used in our experiment, detectable printout was always measured within less than 50 s (i.e., a total flux of 160 J/cm²). S. L. Norman, Appl. Opt. 11, 1234 (1972).

We believe that the explanation for this resistance to printout lies in the bleaching reaction. Not only does the elemental bromine react with the silver grains (2 Ag + Br$_2$ → 2 AgBr), but it also oxidizes functional groups on the gelatin molecules that could otherwise eventually serve as reducers for the silver bromide crystals. Apparently, the wet bleaches do not sufficiently oxidize these functional groups to prevent subsequent printout. The printout reaction can be expressed as:

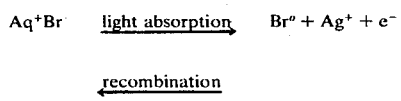

Once the reactive Br$^o$ species is formed, it migrates in the film, but since reducing gelatin functional groups have been oxidized in the bromine vapor bleach, recombination with silver is most probable. Substitution bromination on saturated gelatin molecule parts may occur, but this reaction is much slower than the silver recombination reaction.

We have also found that the bromine vapor bleach is also a good method for reclaiming holograms that have been previously bleached by wet processes and have darkened with light exposure.

EXPOSURE, DEVELOPMENT, AND EFFICIENCY

Higher density amplitude holograms require longer vapor exposures, but the increase in required vapor exposure is not linear with density: higher densities require only slightly longer bleach times.

A comparison of bleach exposure time was made between Kodak 120-02, 649F, and V-F plates. Longer vapor exposures for complete bleaching were necessitated by the thicker emulsions (e.g., 649F films are about 17 μm thick), but grain size [e.g., V-F emulsions are comparatively large grained. (Eastman Kodak Co., *Kodak Plates and Films for Science and Industry*, Publication No. P-9, p. 10-d (1967).)] was not an important factor. The 120-02 plates consistently had better image quality than the 649F plates, and therefore, they were selected as the subject of our investigation.

The tyoe of developer employed in post-exposure processing has a great effect on the resultant developed image. Since complete development data are not currently available, we examined the sensitometric characteristics of three Kodak developers.

Figure 3:
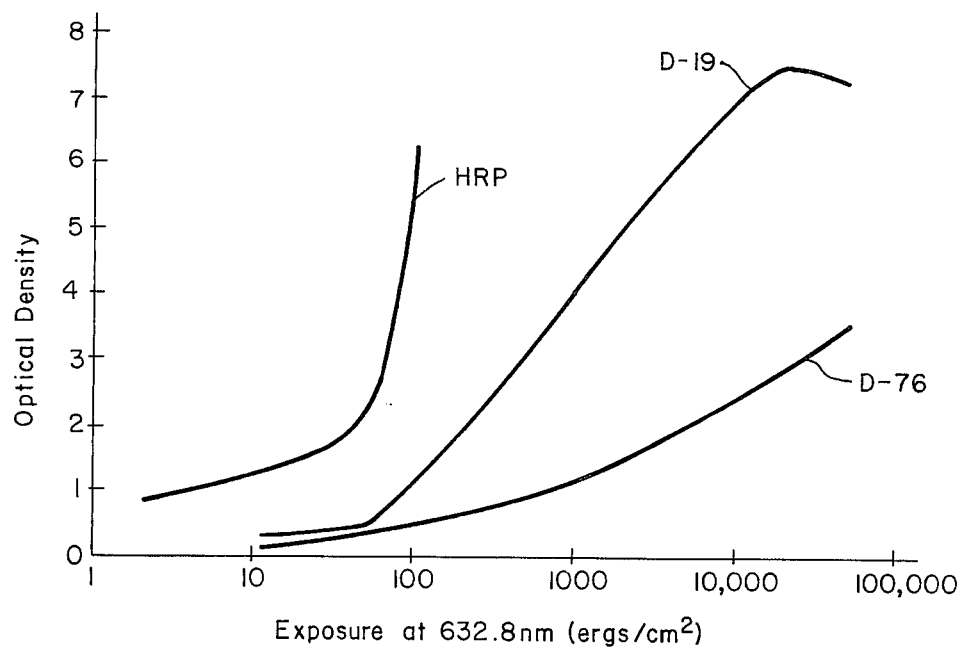

FIG. 3 shows the H and D curves for the three developers we tested with Kodak 120-02 plates. The high resolution plate (HRP) developer has the greatest speed and gamma, but it lacks latitude. The D-76 developer has good latitude but is very slow. For a given exposure, the density can be vastly increased by prolonged development time, although a limit is reached when unexposed areas begin to show excessive veil. A good compromise developer appears to be D-19 when sensitivity, contrast, a latitude are considered.

Figure 4:
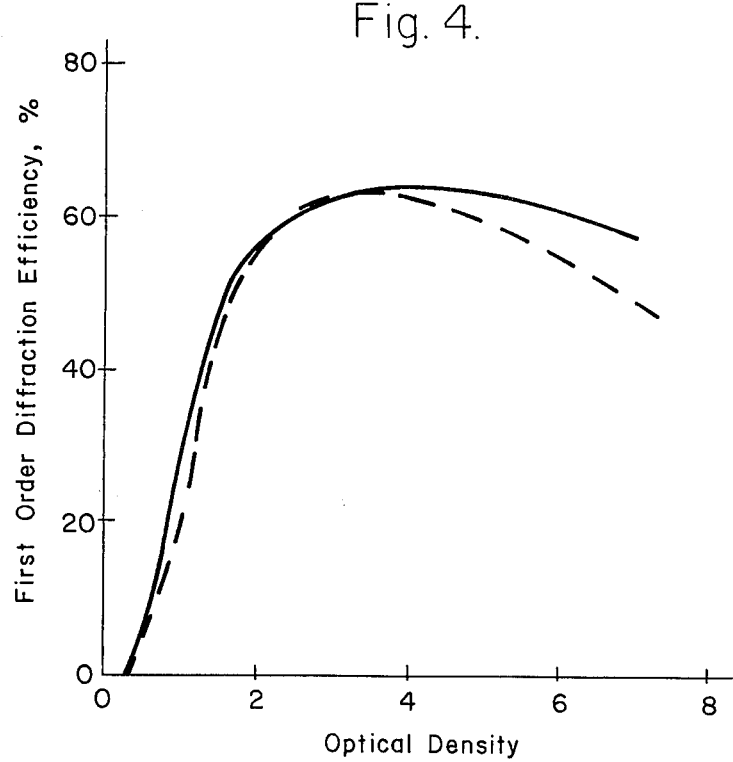

The bleached diffraction efficiencies obtained as a function of developed density are shown in FIG. 4 for a typical plate. The curve is relatively flat for a large density range, so that exact control of developed density is not necessary.

Relief images formed by variations in the height of the gelatin surface can affect diffraction efficiency by introducing phase shifts. Bromine vapor bleached holograms sealed with an index matching adhesive (Loctite 404) exhibit little efficiency change, as shown by the dashed curve in FIG. 4. Efficiency does show a slight decrease at higher prebleach densities after sealing. The minimal relief exhibited by these holograms can be attributed, in part, to the bleach process. Since no liquid contacts the emulsion during bleaching, gelatin is not removed from the surface. Additionally, many liquid bleaches are capable of crosslinking gelatin, producing relief images by tanning. J. H. Altman, Appl. Opt. 5, 1689 (1966). This does not appear to occur in bromine vapor bleaching.

DISADVANTAGES

The bleaching mechanism involves the formation of discrete silver bromide particles which differ in refractive index from the gelatin matrix; these particles also act as sources for light scattering. M. Chang and N. George, Appl. Opt. 9, 713 (1970). Although it may not be possible to completely eliminate this unwanted scattering, (J. N. Latta, Appl. Opt. 7, 2409 (1968) we investigated several factors that may minimize its magnitude.

Lower scatter values could be obtained only at the expense of diffraction efficiency, which, in turn, is a function of developed optical density. An appropriate rule is that the faster the developer, the more scattering noise it produces after bleaching. *Kirk-Othmer Encyclopedia of Chemical Technology* (John Wiley Co., second edition, 1969), vol. 15, p. 378.

We did find that diffraction efficiency of Br$_2$ vapor bleached plates could be increased, without corresponding increases in scattering, by soaking the plates in water and swelling the gelatin film. A bromine vapor-bleached hologram was immersed in water for 20 min. and interrogated in the swollen state. First order diffraction efficiency increased to 75.7%, while scatter remained at previous levels. This efficiency increase, we believe, arises from the differences of the gelatin surrounding high AgBr crystal population regions and low population regions. Previous investigators have used water and organic solvents to extend emulsion thickness. Unfortunately, we observed that the high efficiency, water-expanded holograms are sensitive to further light exposure. Noticeable printout darkening could be subjectively detected after the plates were exposed to ambient fluorescent lighting for two days.

In summary, the virtues of the dry bromine bleach in comparison with wet bleach methods are, in particular, simplicity and ease of application, low film distortion, high resulting diffraction efficiency, and exceptional resistance to environmental stress. The major remaining obstacle preventing bleached photographic plates from being an ideal holographic material is the inherent scattering noise.

Having fully described my process, its product and its utility above, the scope of my invention as claimed below may now be understood.

What is claimed is:

1. A process for the fabrication of a hologram having a resistance to printout greater than 500 seconds at a light power level of at least 3.4 watts per square centimeter and low film distortion consisting of the following steps;
   A. Exposing a photographic plate comprising a silver halide emulsion on a transparent substrate to the interfering beams of a laser,
   B. Developing and fixing said exposed plate in a conventional manner,
   C. Drying said developed plate,
   D. Exposing said plate to halogen vapor source until said plate is transparent, and
   E. Aerating said plate until halogen discoloration, if any, is removed.

2. The process of claim 1 wherein said halogen source is bromine vapor.

3. The process of claim 1 wherein said halogen source is chlorine gas.

4. The process of claim 1 wherein said halogen exposure is accomplished by causing liquid bromine to flow over said exposed photographic plate.

5. The process of claim 1 wherein said plate is rendered transparent by causing a solution of liquid bromine in an inert solvent taken from the group consisting of $CCl_4$, $CBr_4$ and $C_2Cl_6$ to flow over said exposed photographic plate.

6. The process of claim 1 wherein said halogen exposure is accomplished by first applying concentrated HCl and next applying fuming $HNO_3$ vapors to said exposed plate.

7. A hologram formed by the process of claim 1 consisting of a gelatin and silver halide emulsion on a transparent substrate having a resistance to printout greater than 500 seconds at a light power level of at least 3.4 watts per square centimeter and low film distortion.

* * * * *